(12) United States Patent
Veneruso

(10) Patent No.: US 10,399,680 B2
(45) Date of Patent: Sep. 3, 2019

(54) DISPLACEMENT MECHANISM OF A TRAY TABLE MOUNTED ON AN ARMREST OF A SEAT, IN PARTICULAR AN AIRPLANE SEAT

(71) Applicant: GEVEN S.P.A., Nola (IT)

(72) Inventor: Getullio Veneruso, Nola (IT)

(73) Assignee: GEVEN S.P.A., Nola (IT)

( * ) Notice: Subject to any disclaimer, the term of this patent is extended or adjusted under 35 U.S.C. 154(b) by 400 days.

(21) Appl. No.: 15/302,554

(22) PCT Filed: Apr. 7, 2015

(86) PCT No.: PCT/IT2015/000100
§ 371 (c)(1),
(2) Date: Oct. 7, 2016

(87) PCT Pub. No.: WO2015/155796
PCT Pub. Date: Oct. 15, 2015

(65) Prior Publication Data
US 2017/0029116 A1 Feb. 2, 2017

(30) Foreign Application Priority Data

Apr. 7, 2014 (IT) .............................. RM2014A0181

(51) Int. Cl.
*B64D 11/06* (2006.01)
*B60N 3/00* (2006.01)
*B60N 2/75* (2018.01)

(52) U.S. Cl.
CPC ............ *B64D 11/0638* (2014.12); *B60N 2/79* (2018.02); *B60N 3/002* (2013.01); *B64D 11/06* (2013.01); *B64D 11/0646* (2014.12)

(58) Field of Classification Search
CPC . B64D 11/0638; B64D 11/0646; B64D 11/06; B60N 3/002

(Continued)

(56) References Cited

U.S. PATENT DOCUMENTS

| 6,923,505 B2 * | 8/2005 | Siminovitch ............ A47C 7/54 248/118.1 |
| 2002/0003361 A1 | 1/2002 | Duerr et al. |

(Continued)

FOREIGN PATENT DOCUMENTS

| DE | 10224048 A1 | 12/2003 |
| WO | 2012082071 A1 | 6/2012 |

OTHER PUBLICATIONS

International Search Report and Opinion dated Aug. 31, 2015 in corresponding Application No. PCT/IT2015/000100; 10 pgs.

(Continued)

*Primary Examiner* — Anthony D Barfield
(74) *Attorney, Agent, or Firm* — Maier & Maier, PLLC

(57) ABSTRACT

A displacement mechanism of a tray table mounted on an armrest of a seat, said mechanism allowing to correct the lie angle of said tray table keeping it substantially horizontal, said seat being provided with a displacement mechanism, said displacement mechanism of a tray table providing a lever, hinged in the front-upper zone of the armrest where said tray table is arranged, said lever allowing said tray table to rotate in a longitudinal vertical plane, a hinge, arranged at the end of said lever opposite to the one hinged to the armrest, allowing said tray table to rotate according to an arc of a circle lying in a substantially vertical transversal plane, coupling means, provided under said tray table, and downward facing, when said tray table is in a use position, in proximity of said hinge, said lever being hinged on the armrest.

7 Claims, 7 Drawing Sheets

(58) Field of Classification Search
USPC .................................................. 297/154, 160
See application file for complete search history.

(56) References Cited

U.S. PATENT DOCUMENTS

2006/0061149 A1* 3/2006 Tsai ........................ A47C 7/68
                                                          297/160
2011/0148156 A1   6/2011 Westerink et al.

OTHER PUBLICATIONS

Search report issued on the Italian priority application No. RM2014A000181 dated Dec. 4, 2014; 9 pgs.

* cited by examiner

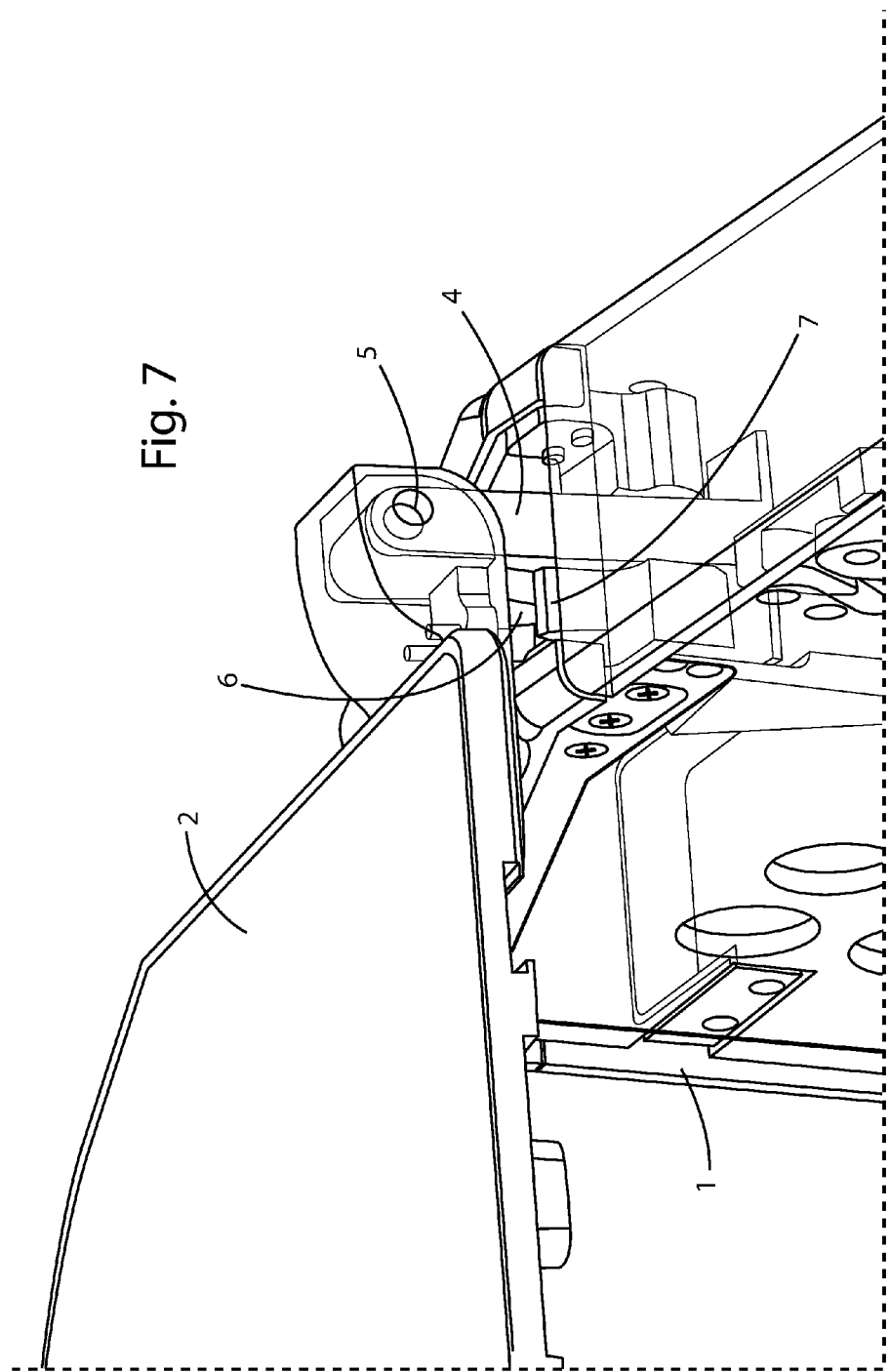

DISPLACEMENT MECHANISM OF A TRAY TABLE MOUNTED ON AN ARMREST OF A SEAT, IN PARTICULAR AN AIRPLANE SEAT

The present invention relates to a displacement mechanism of a tray table mounted on an armrest of a seat, in particular an airplane seat. More specifically, the invention concerns a mechanism of the above kind permitting freeing the lying of the tray with respect to that of the seat on which it is mounted, permitting that said lying is essentially horizontal also when the movable part of the seat is inclined with respect to the horizontal plane.

As it is well known, usually long-haul aviation seats have a tray for each passenger stowed within one of the sides—armrest of the same seat.

When the table must be used, it is extracted from the housing within the armrest, and by pivoting and link mechanisms, it is brought in front of the passenger, in a position useful to be used to support objects or food and beverages and meals.

It is well evident the need that such a table must be substantially horizontal, in order to prevent fall of objects, food and beverages, e.g. while moving the seat.

Particularly, if the seat can make a cradle or rocking movement, the problem exists of permitting to the passenger to still using the table, maintaining its lying essentially horizontal, also when the main movable part of the seat, including sides and armrests, moves coming to be in an inclined position with respect to the support plane.

In view of the above, it is well evident the needing of realizing a mechanism permitting automatically correcting the lying angle of said table, maintaining it essentially horizontal, regardless the seat is rotated backward, like a rocking chair, or it is in a standard position, or in any intermediate position between them.

An object of the present invention is that of providing a mechanism of the above kind that can be used on every seat provided with a cradle movement.

It is therefore specific object of the present invention a displacement mechanism of a tray table mounted on an armrest of a seat, in particular of an airplane seat, said mechanism allowing to automatically correct the lie angle of said tray table keeping it substantially horizontal, said seat being provided with a cradle type displacement mechanism, said displacement mechanism of a tray table being characterized in providing a lever, hinged in the front-upper zone of the armrest wherein said tray table is arranged, said lever allowing said tray table to rotate in a longitudinal vertical plane, a hinge, arranged at the end of said lever opposite to the one hinged to the armrest, allowing said tray table to rotate according to an arc of a circle lying in a substantially vertical transversal plane, coupling means, provided under said tray table, and downward facing, when said tray table is in a use position by the passenger, in proximity of said hinge, said lever being hinged on the armrest on the same axis of an adjusting element, said adjusting element being shaped in order to allow engagement and disengagement by said coupling means, to a connection element with the displacement mechanism of the seat.

Particularly, according to the invention, said coupling means can be a tooth, provided under said tray table, and downward facing, when said tray table is in a use position by the passenger, and in that said adjusting element is shaped so as to comprise a cavity in its upper peripheral profile, said cavity having an identical and complementary profile to that of said tooth in order to allow engagement and disengagement by means of said tooth to a connection element with the displacement mechanism of the seat.

Alternatively, according to the invention, said coupling means can be a cavity, provided under said tray table, and downward facing, when said tray table is in a use position by the passenger, and in that said adjusting element is shaped so as to comprise a tooth in its upper peripheral profile, said tooth having an identical and complementary profile to that of said cavity in order to allow engagement and disengagement by means of said cavity to a connection element with the displacement mechanism of the seat.

Preferably, according to the invention, said cavity of said adjusting element or of said coupling means can have a trapezoidal shape.

Furthermore, according to the invention, said adjusting element is connected to said connection element by means of a suitable kinematic chain.

Always according to the invention, said connection element can be made of a finger shaped element.

The present invention will be described in the following for illustrative, but not limitative purposes, according to its preferred embodiments, with particular reference to the figures of the enclosed drawings, wherein.

Figure 3:
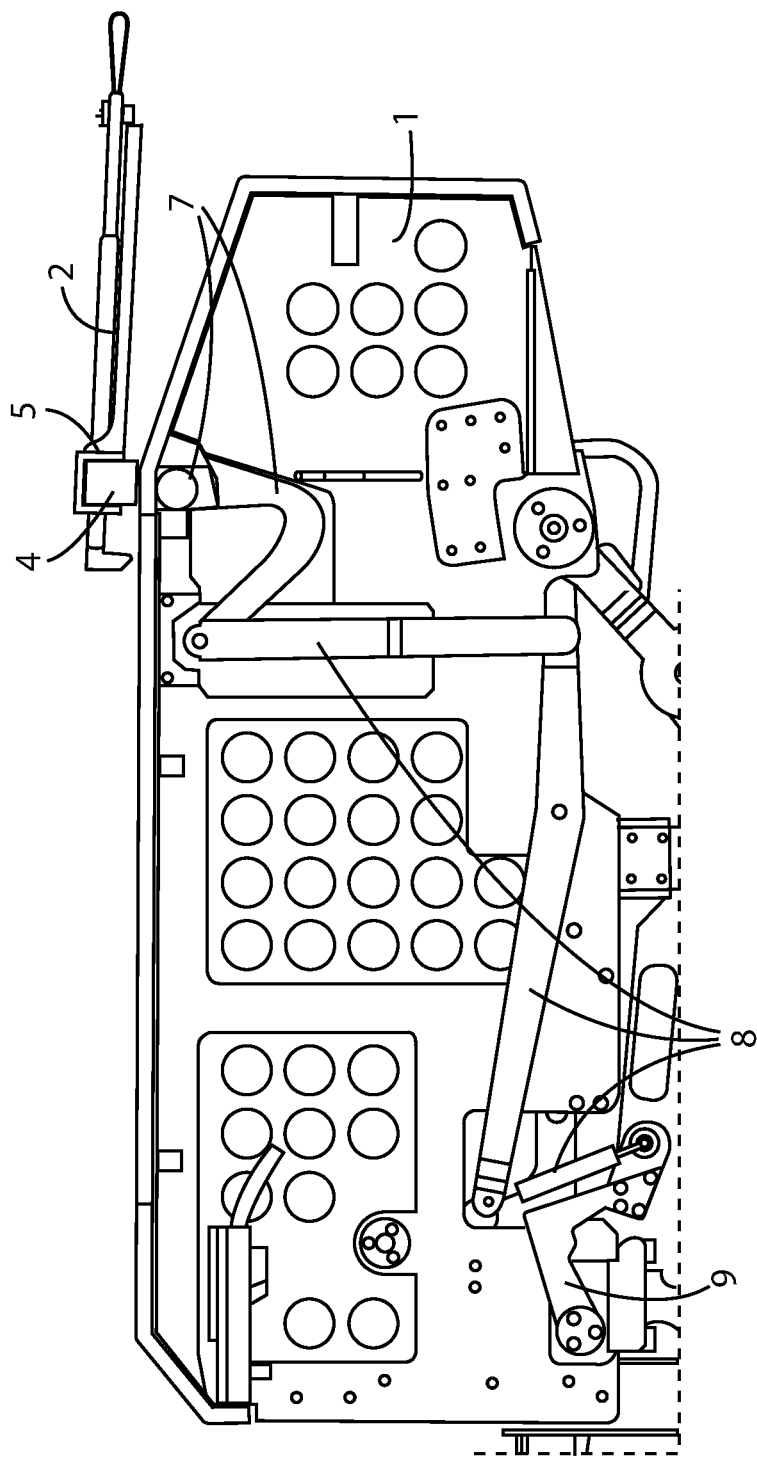
Figure 4:
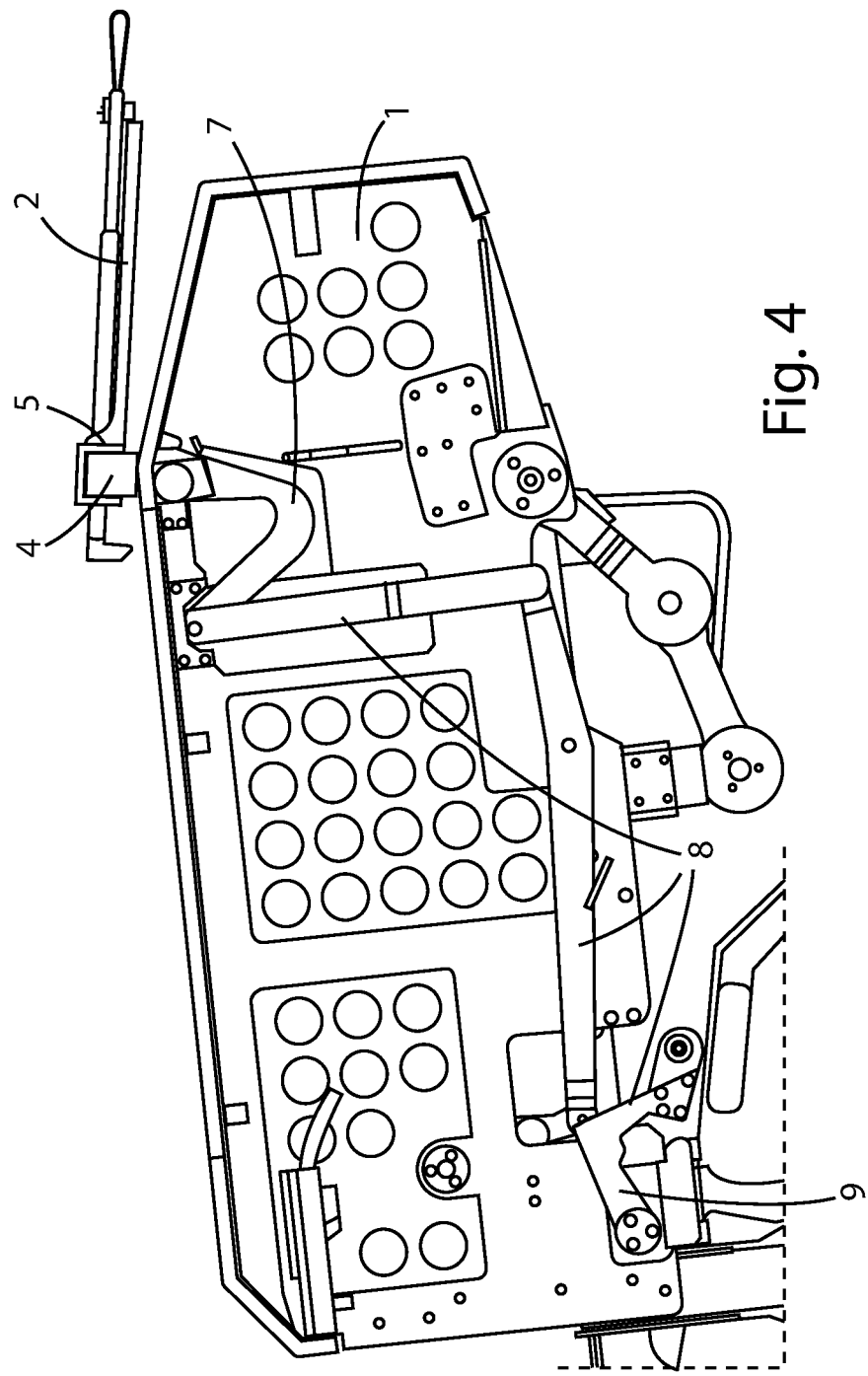
Figure 5:
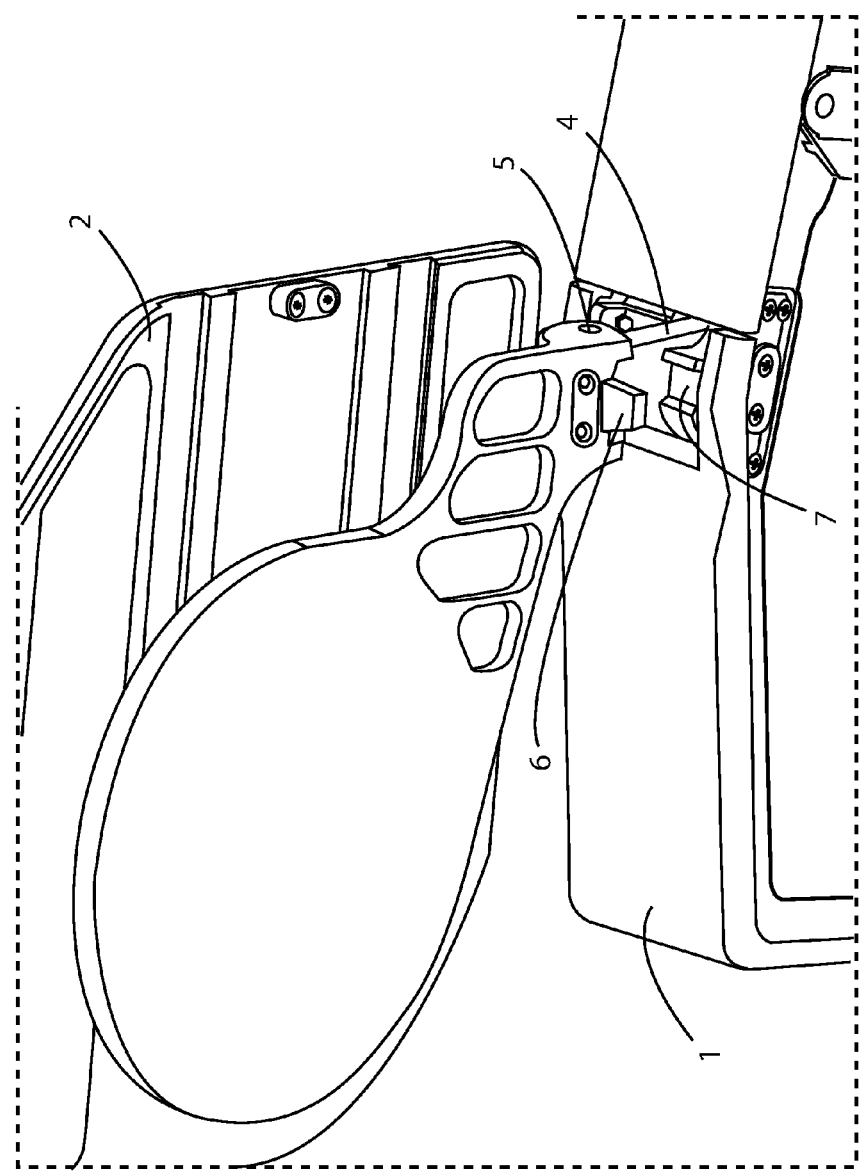
Figure 6:
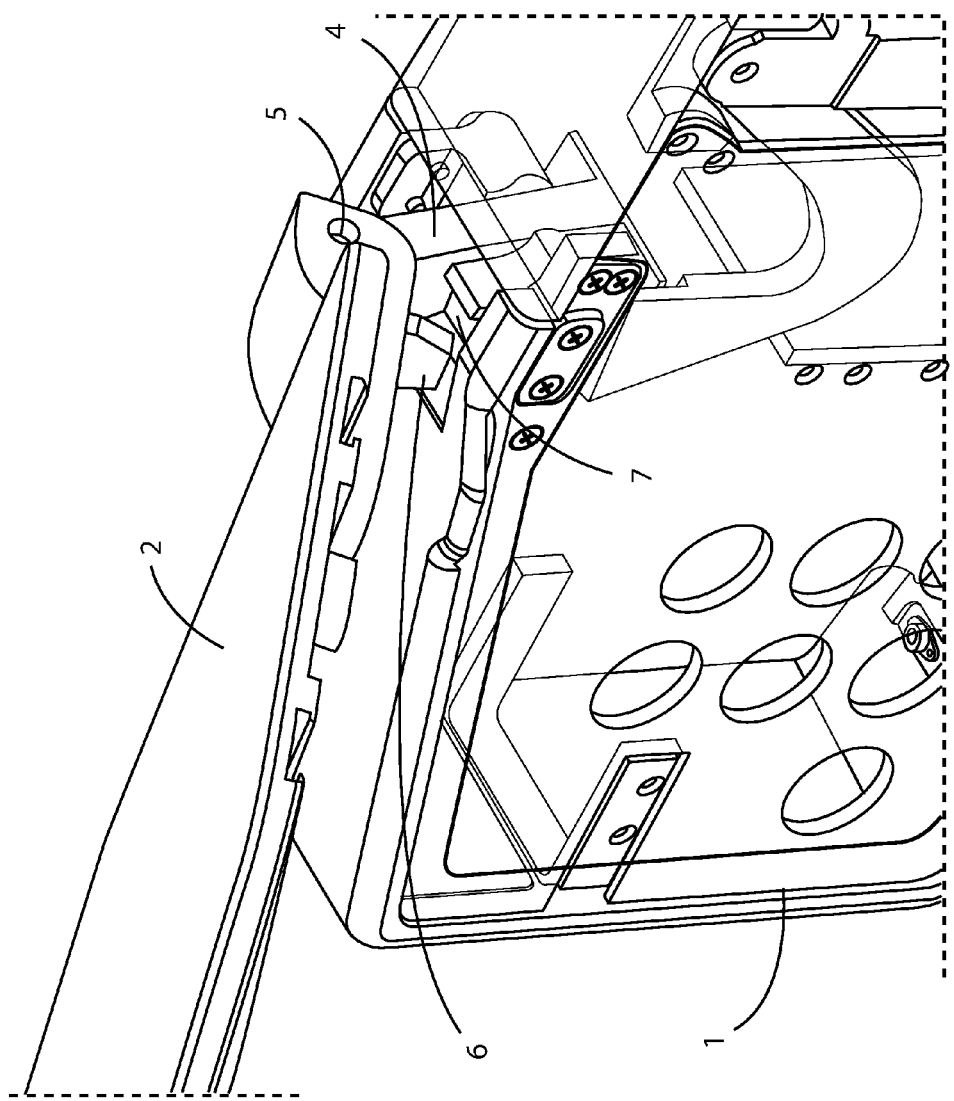

FIG. 3 schematically shows a first view of the mechanism according to the invention;

FIG. 4 schematically shows a second view of the mechanism according to the invention;

FIG. 5 schematically shows the initial step of deployment of the tray table after its extraction from a side—armrest provided with the mechanism according to the invention;

FIG. 6 shows an intermediate step of deployment of tray table and shows a particular of mechanism of FIG. 5; and FIG. 7 shows the final step of deployment of tray table provided with mechanism of FIG. 5.

Figure 1:
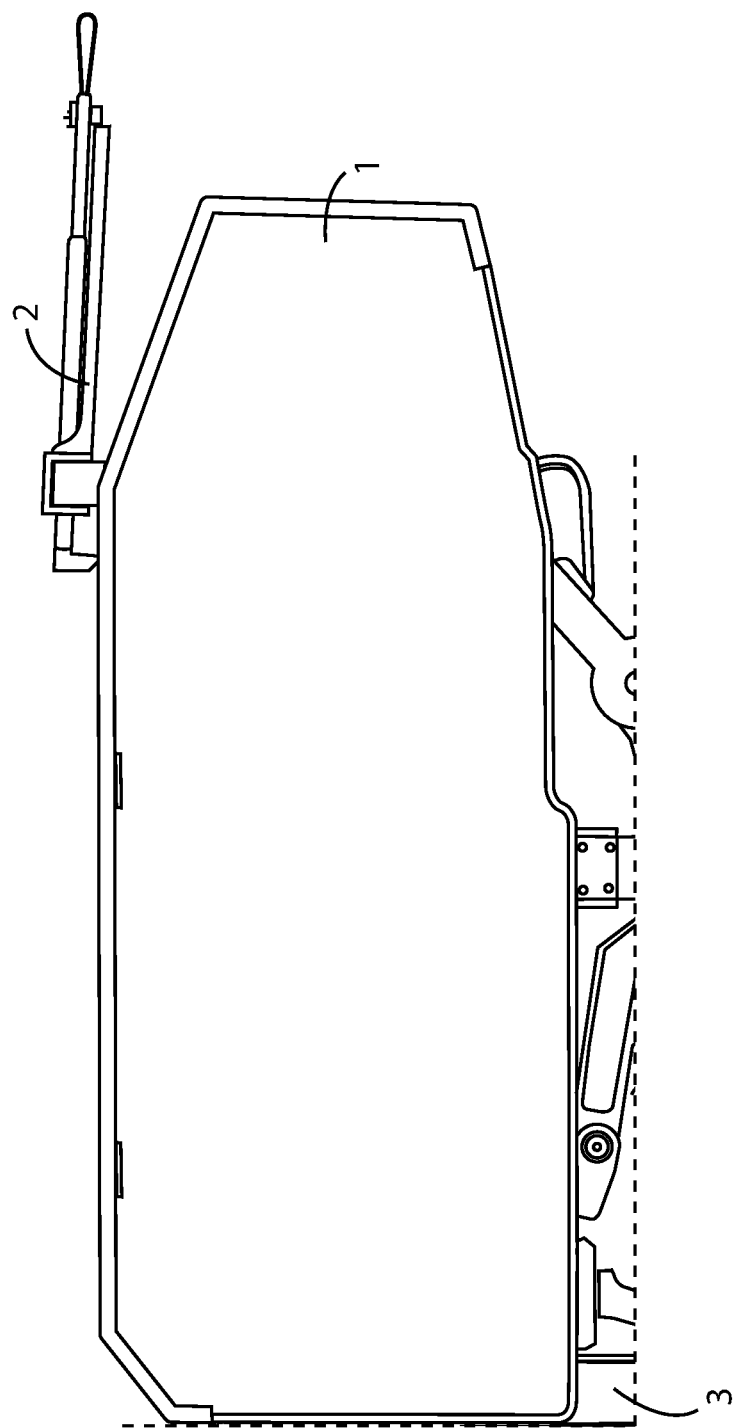
FIG. 1 is a first schematic view of a side—armrest with tray table extracted.

Observing the figures of the enclosed drawings, it is described an embodiment of the mechanism according to the invention. Particularly, side—armrest 1, with tray table 2 extracted, are schematically shown in FIG. 1.

By reference number 3 it is generically indicated mechanism of the seat (not shown), that can be every type of seat permitting cradle movement.

The solution according to the present invention claimed and shown in the figures does not require any control system assisted by electronic systems suitably programmed, but it is only based on mechanisms operated by movements of the main movable part 3 of the seat.

Observing now FIGS. 3-7, it is noted that joint mechanism according to the invention for tray table 2 comprises a lever 4, hinged to the front—upper zone of side 1 on which tray table 2 is provided.

Said lever 4 permits rotations of tray table 2 about a longitudinal vertical plane.

A hinge 5 is provided at the end of the lever 4 opposed with respect to the hinged end, permitting to the tray table 2 to rotate along an arc lying along a plane that is an essentially vertical—transverse plane.

Further, table 2 has a tooth 6 in its lower part (see FIG. 7) (when in the passenger use position) close to said hinge 5. When table 2 is in the passenger use position, said tooth 6 is thus faced downward.

Lever 4 on which tray table 2 is hinged, is hinged on side—armrest 1 on the same axis of an adjustment axis 7, having a cavity in its upper peripheral profile. Said cavity can have a profile equal and complementary with respect to the profile of the tooth 6, e.g. a trapezoidal shape, to promote engagement and disengagement of tooth 6 from said cavity.

As an alternative, in further embodiments not shown, having the same effects, cavity can be provided in the tray table and the tooth in the adjustment element, thus obtaining the same result described with reference to the solution providing the tooth on the tray table and the cavity on the adjustment element.

When the tray table 2 extracted from the side—armrest 1 is rotated to be brought in the use position, said tooth 6 engages within the cavity of the abovementioned adjustment element 7.

Thus, attitude (and thus lying of the tray table 2 surface plane) is due to the adjustment element 7 with which it is engaged, in a set longitudinal angular position, tooth 6 of tray table 2.

Figure 2:
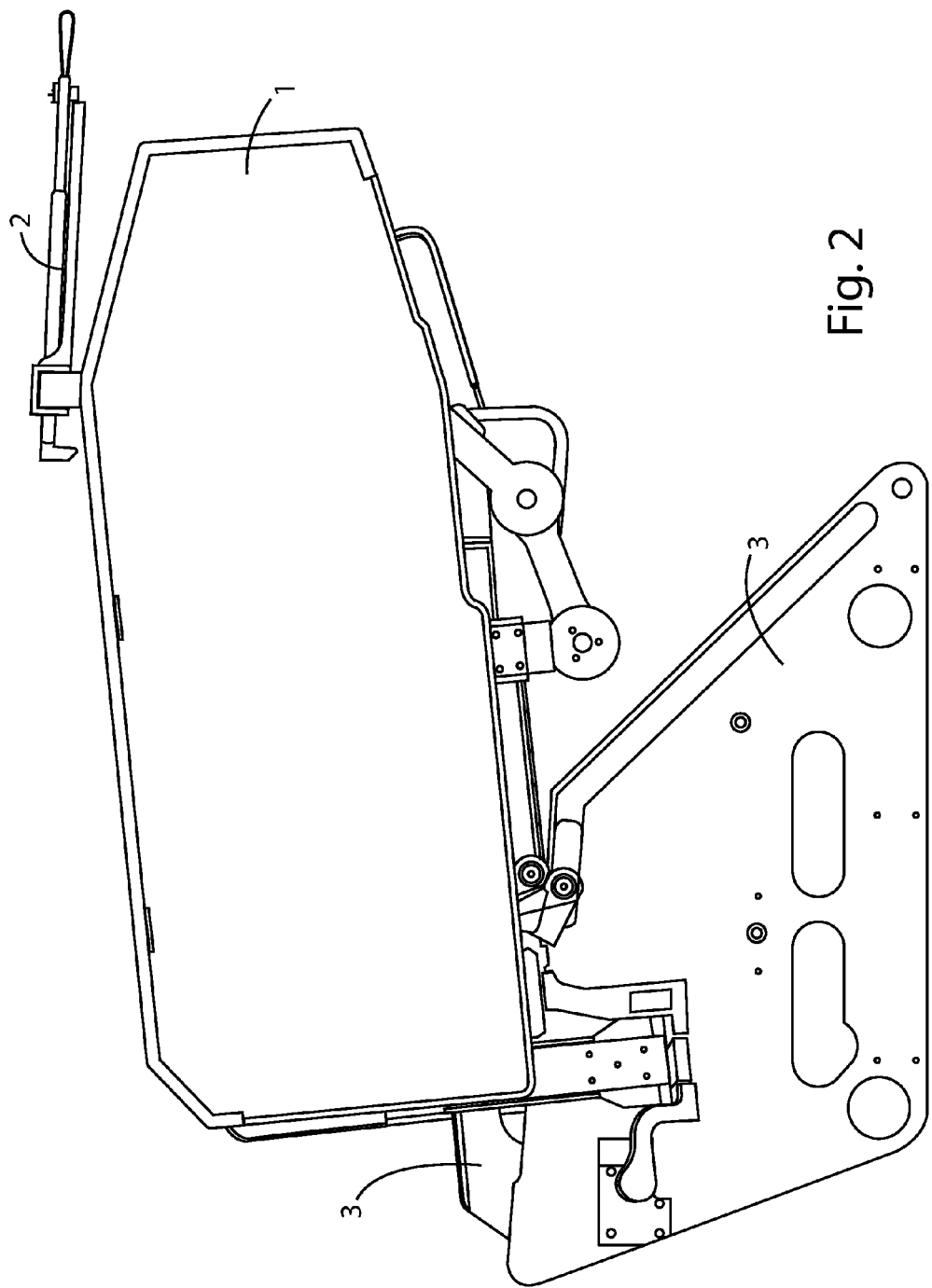
FIG. 2 is a second schematic view of a side—armrest with tray table extracted and partial view of the main structure or seat during its displacement.

The above adjustment element 7 is connected through a suitable kinematic chain (as for example illustrated, for illustrative, but not limitative, purposes in FIGS. 3 and 4 and generically indicated by reference number 8, since the same result can be obtained by a different kinematic chain) with finger 9, varying its angulation with respect to side—armrest 1, if the latter is in the standard transition arrangement (FIG. 1) or in the cradle arrangement (FIG. 2).

Kinematic chain 8 mentioned in the above permits to the adjustment element 7 rotating in such a way to maintain tray table 2 attitude constantly close to the horizontal plane.

The present invention has been described for illustrative, but not limitative, purposes, according to its preferred embodiments, but it is to be understood that variations and/or modifications can be introduced by one skilled in the art, without departing from the relevant scope as defined in the enclosed claims.

The invention claimed is:

1. An airplane seat displacement mechanism, comprising:
a displacement mechanism of a tray table mounted on an armrest of a seat, said mechanism allowing to automatically correct the lie angle of said tray table keeping it substantially horizontal, said seat being provided with a cradle type displacement mechanism;
said displacement mechanism of a tray table providing a lever, hinged in the front-upper zone of the armrest where said tray table is arranged, said lever allowing said tray table to rotate in a longitudinal vertical plane;
a hinge, arranged at the end of said lever opposite to the one hinged to the armrest, the hinge allowing said tray table to rotate according to an arc of a circle lying in a substantially vertical transversal plane;
coupling means, provided under said tray table, and downward facing, when said tray table is in a use position by the passenger, in proximity of said hinge;
said lever being hinged on the armrest on the same axis of an adjusting element;
said adjusting element being shaped in order to allow engagement and disengagement by said coupling means, to a connection element with the displacement mechanism of the seat.

2. Mechanism according to claim 1, wherein said coupling means is a tooth, provided under said tray table, and downward facing, when said tray table is in a use position by the passenger, and in that said adjusting element is shaped so as to comprise a cavity in its upper peripheral profile, said cavity having an identical and complementary profile to that of said tooth in order to allow engagement and disengagement by means of said tooth to a connection element with the displacement mechanism of the seat.

3. Mechanism according to claim 1, wherein said coupling means is a cavity, provided under said tray table, and downward facing, when said tray table is in a use position by the passenger, and in that said adjusting element is shaped so as to comprise a tooth in its upper peripheral profile, said tooth having an identical and complementary profile to that of said cavity in order to allow engagement and disengagement by means of said cavity to a connection element with the displacement mechanism of the seat.

4. Mechanism according to claim 2, wherein said cavity of said adjusting element or of said coupling means has a trapezoidal shape.

5. Mechanism according to claim 1, wherein said adjusting element is connected to said connection element by means of a suitable kinematic chain.

6. Mechanism according to claim 1, wherein said connection element is made of a finger shaped element.

7. Mechanism according to claim 1, wherein said seat is an airplane seat.

* * * * *